Sept. 19, 1950 G. N. JEPPSON ET AL 2,523,025
TUNNEL KILN CHARGING AND DISCHARGING MEANS
Filed May 10, 1947 10 Sheets-Sheet 1

Inventors
GEORGE N. JEPPSON
EDWARD VAN DER PYL

Sept. 19, 1950  G. N. JEPPSON ET AL  2,523,025
TUNNEL KILN CHARGING AND DISCHARGING MEANS
Filed May 10, 1947  10 Sheets-Sheet 2
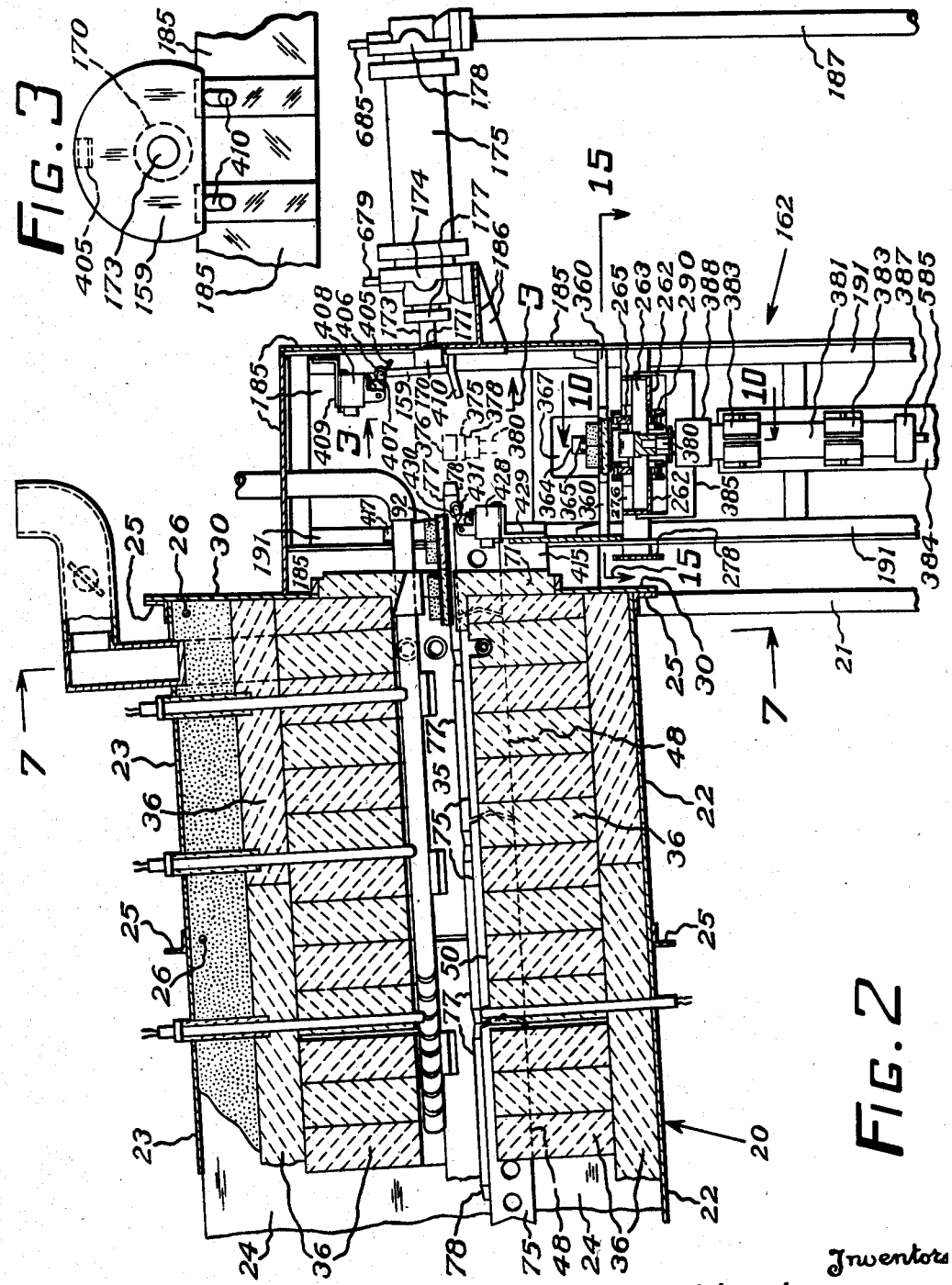
Inventors
GEORGE N. JEPPSON
EDWARD VAN DER PYL
By *[signature]* Attorney Sept. 19, 1950　　　G. N. JEPPSON ET AL　　　2,523,025
TUNNEL KILN CHARGING AND DISCHARGING MEANS
Filed May 10, 1947　　　　　　　　　　　10 Sheets-Sheet 3
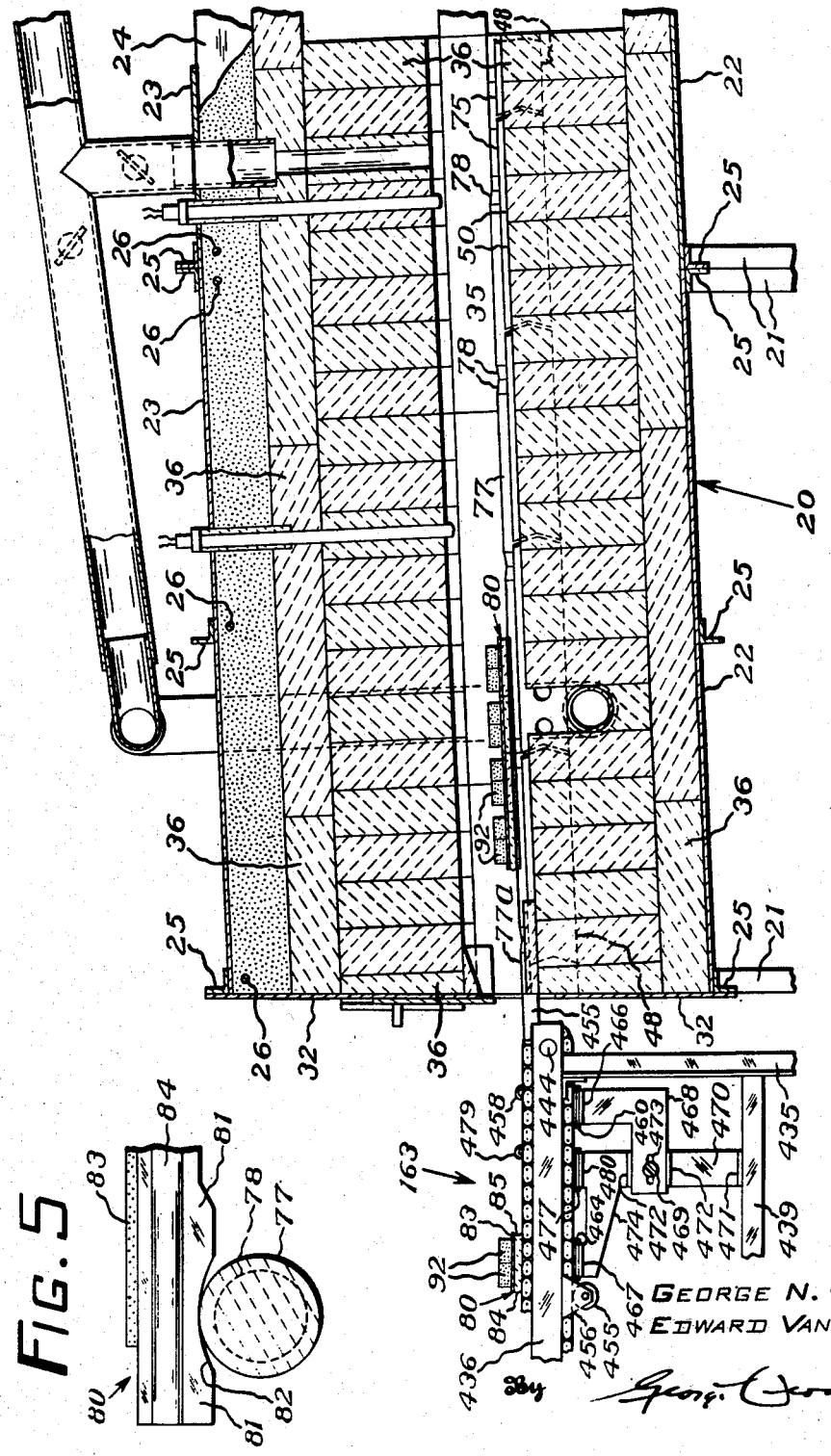
Inventors
GEORGE N. JEPPSON
EDWARD VAN DER PYL
By George Compton
Attorney Sept. 19, 1950      G. N. JEPPSON ET AL      2,523,025
TUNNEL KILN CHARGING AND DISCHARGING MEANS
Filed May 10, 1947      10 Sheets-Sheet 4
FIG.6
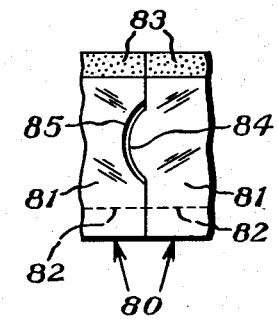
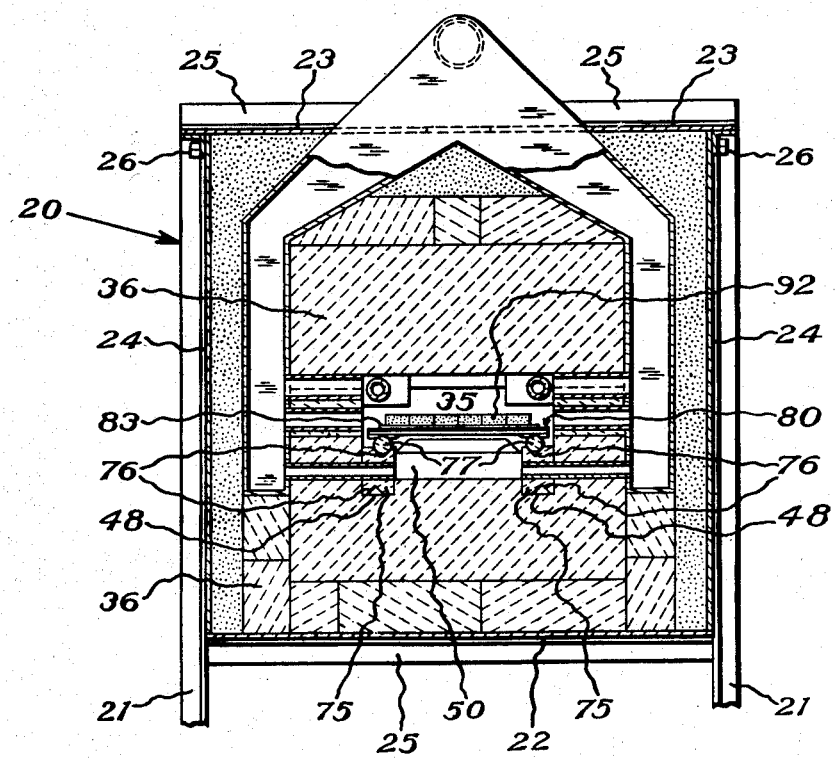
FIG.7
Inventors
GEORGE N. JEPPSON
EDWARD VAN DER PYL
By George [signature] Attorney

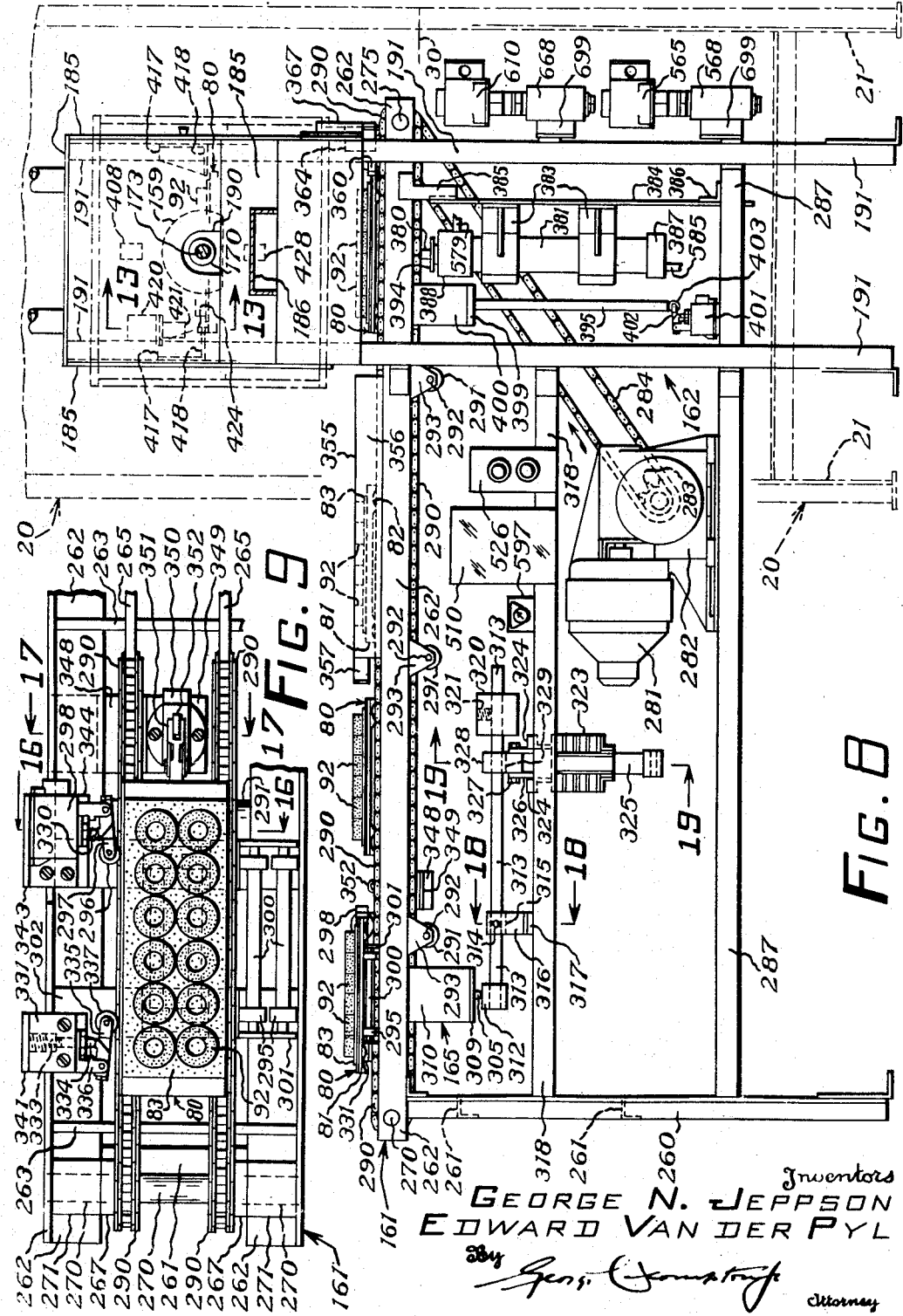

Sept. 19, 1950 G. N. JEPPSON ET AL 2,523,025
TUNNEL KILN CHARGING AND DISCHARGING MEANS
Filed May 10, 1947 10 Sheets-Sheet 6

Inventors
GEORGE N. JEPPSON
EDWARD VAN DER PYL
By George [signature] Attorney

Sept. 19, 1950 G. N. JEPPSON ET AL 2,523,025
TUNNEL KILN CHARGING AND DISCHARGING MEANS
Filed May 10, 1947 10 Sheets-Sheet 7
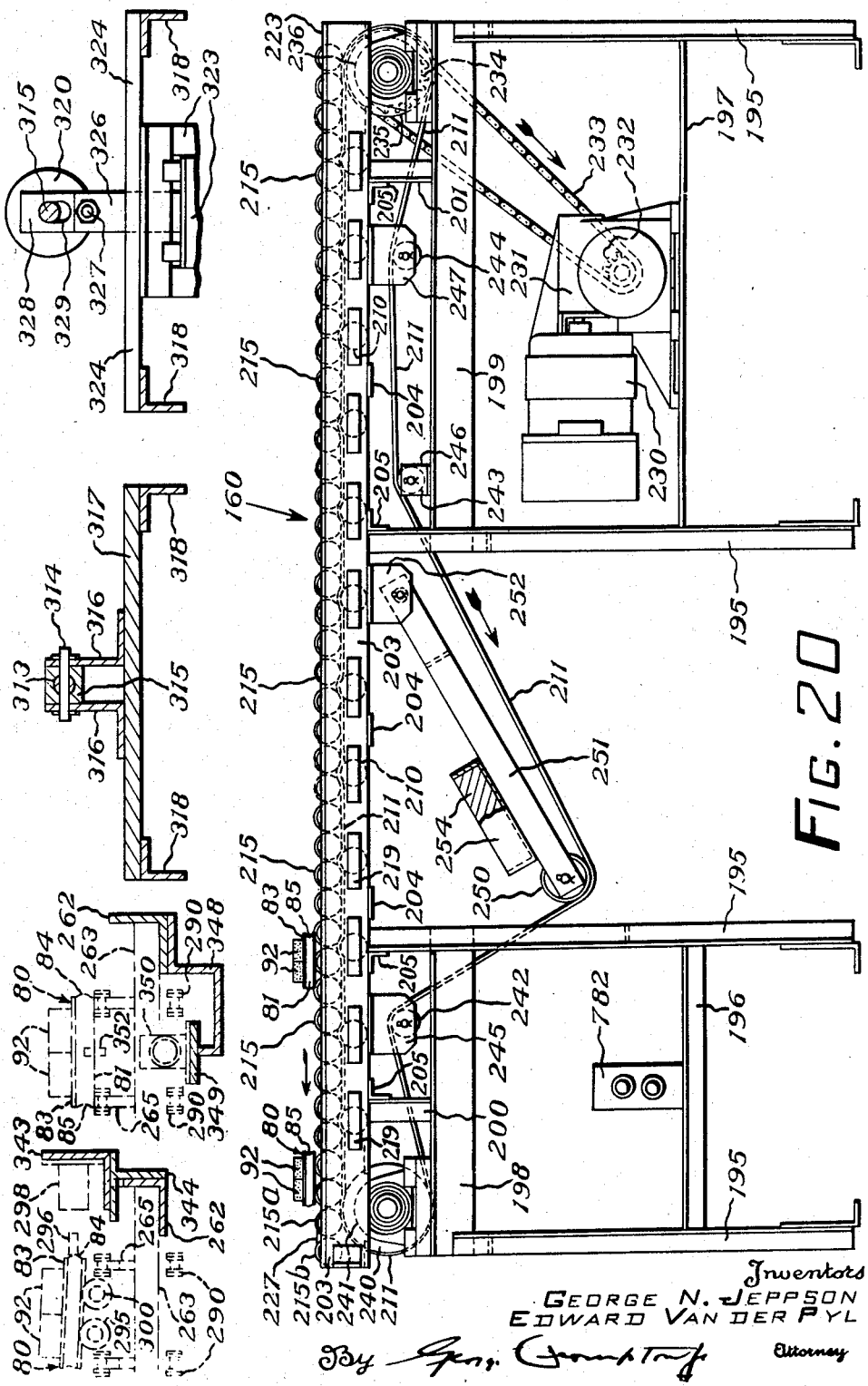
Inventors
GEORGE N. JEPPSON
EDWARD VAN DER PYL
By Attorney

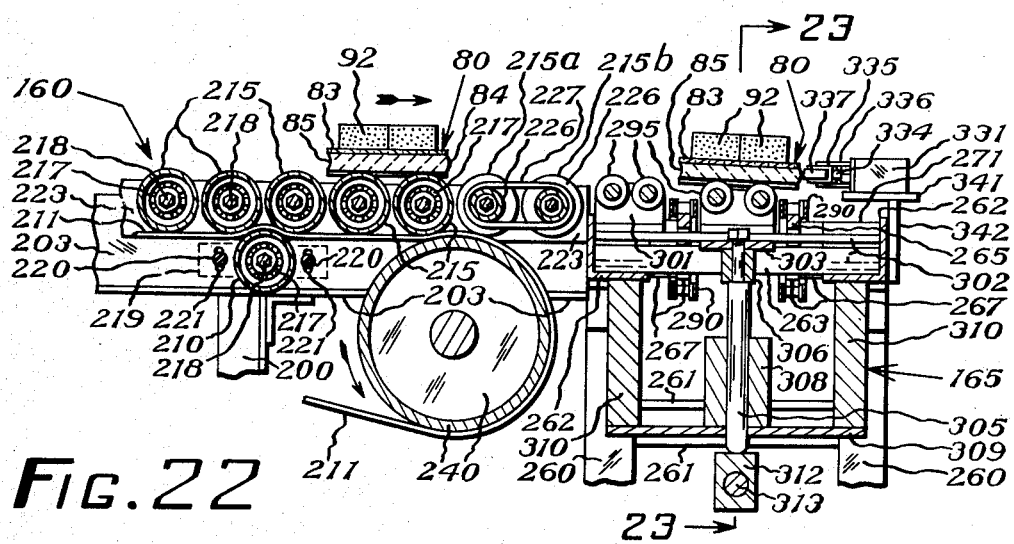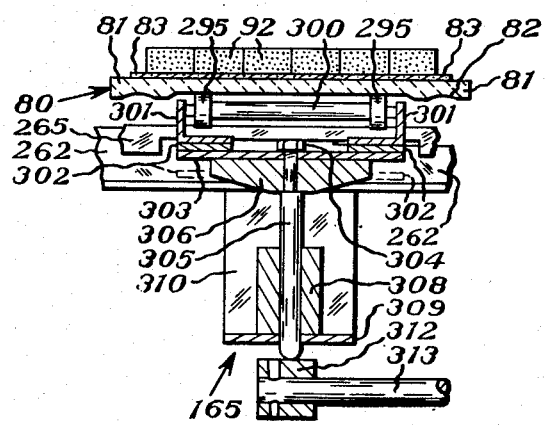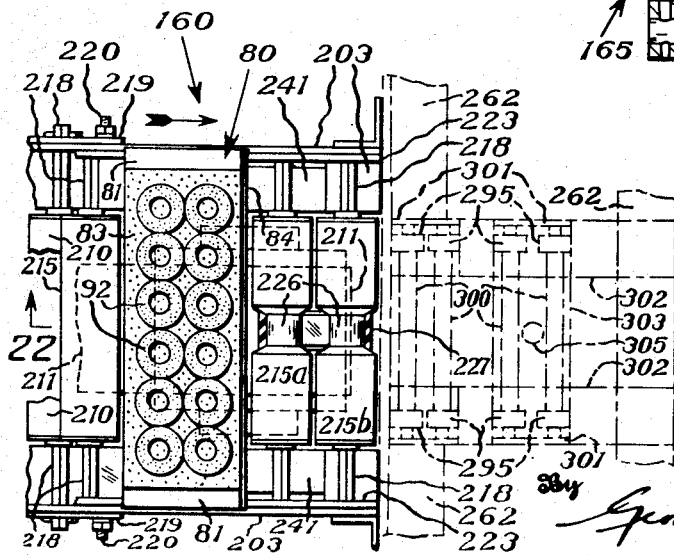

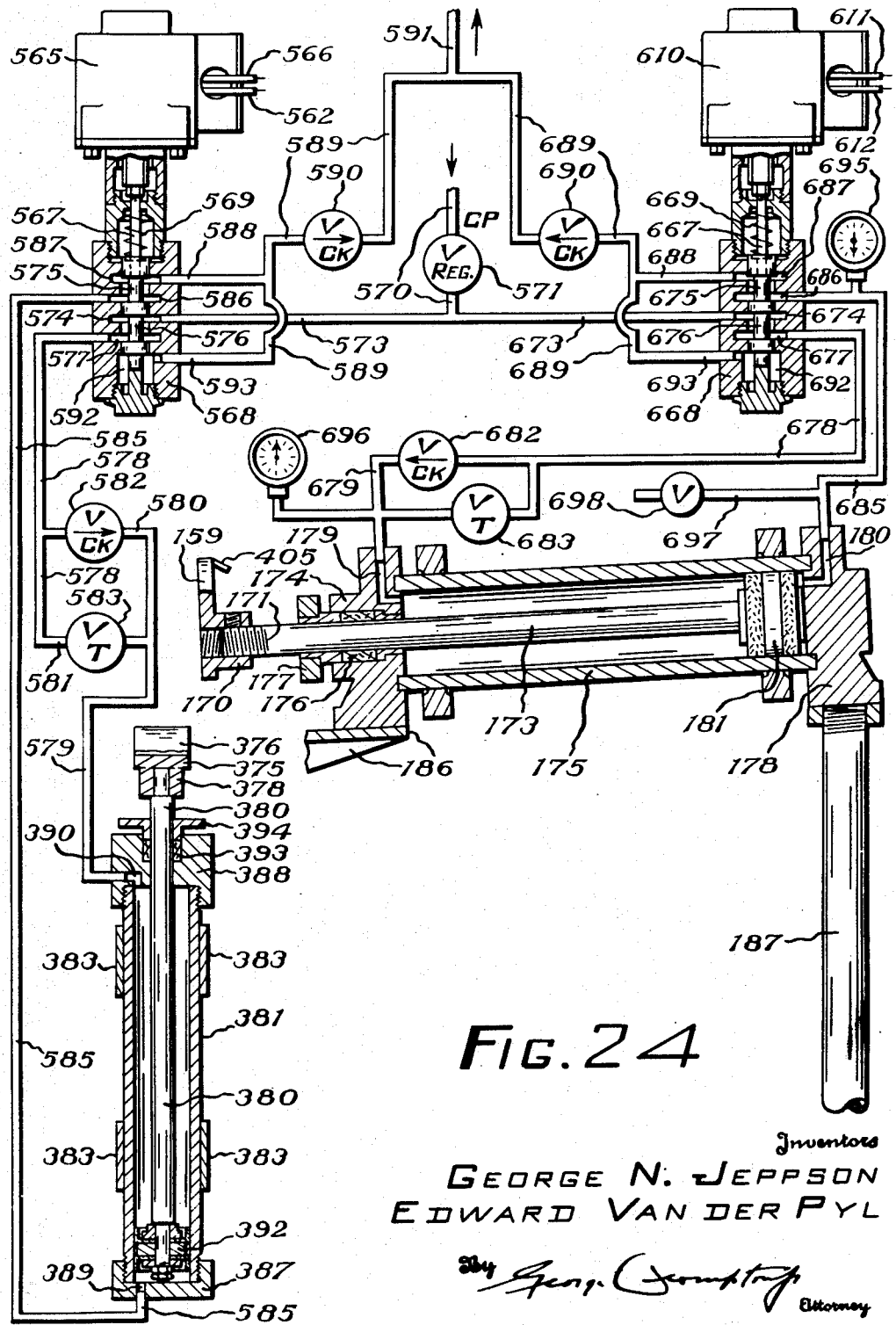

Patented Sept. 19, 1950

2,523,025

UNITED STATES PATENT OFFICE 2,523,025

TUNNEL KILN CHARGING AND DISCHARGING MEANS

George N. Jeppson, Worcester, and Edward Van der Pyl, Holden, Mass., assignors to Norton Company, Worcester, Mass., a corporation of Massachusetts Application May 10, 1947, Serial No. 747,169

6 Claims. (Cl. 214—18)

The invention relates to loading and discharging mechanism to feed "green" ware such as grinding wheels into and through a tunnel kiln and to remove the vitrified ware or wheels from the kiln, thus making the kiln automatic in operation. This application discloses the tunnel kiln claimed in a copending application Serial No. 747,170 and now Patent No. 2,519,250 granted August 15, 1950 filed May 10, 1947 by ourselves and Wallace L. Howe jointly and which is assigned to the same assignee as the present application.

One object of the invention is to increase the rate of production of vitrified grinding wheels. Another object is to enable vitrified grinding wheels to be manufactured more cheaply.

Another object of the invention is to provide apparatus for the continuous vitrification of "green" wheels in an automatic manner. Another object is to provide apparatus which will greatly reduce the labor required for manufacturing vitrified grinding wheels.

Another object is to provide a highly efficient and easily operated continuous kiln. Another object is to eliminate cars with wheels or the like in a tunnel kiln. Another object is to provide a tunnel kiln and equipment therefor in which everything passing through the firing zone and in the firing zone is made out of non-metallic refractory material, thus eliminating sand seals and the like and reducing the height and the mass of the kiln. Another object is to reduce the cost of operating a tunnel kiln both for repairs and for labor. Another object of the invention is to provide a fully automatic tunnel kiln with conveyors so that when loads of ware are deposited at a loading station, they will be picked up, one load at a time, put through the kiln and removed, one load at a time, and collected at a receiving station. Another object is to provide a dependable kiln loading mechanism operating at adjustable time intervals.

Other objects are to provide tunnel kiln conveyor mechanism including loading, feeding, charging and discharging apparatus, which will operate automatically in repeating cycles, with interlocking controls so that the cycle will be interrupted if anything goes amiss, and with safety devices to prevent accidents. Another object is to provide a tunnel kiln and operating mechanism, in which everything in or near the tunnel is entirely refractory. Another object is to provide entirely refractory ware conveying apparatus together with propelling mechanism therefor which is throroughly reliable in operation.

Other objects will be in part obvious or in part pointed out hereinafter.

The invention accordingly consists in the features of construction, combinations of elements, and arrangements of parts, all as will be illustratively described herein, and the scope of the application of which will be indicated in the following claims.

In the accompanying drawings illustrating a tunnel kiln and automatic mechanism for propelling the ware ("green" grinding wheels to be vitrified) through the kiln.

Figure 2 is a fragmentary vertical central sectional view on an enlarged scale of the entrance end and preheating zone of the kiln showing also the elevator for raising the batts to the kiln tunnel level and the propelling or charging mechanism for intermittently propelling the batts through the kiln.

Figure 3 is an elevation of the front end of the batt propelling ram, the view being taken from the line 3—3 of Figure 2 looking in the direction of the arrows.

Figure 4 is a fragmentary vertical sectional view of the kiln showing the annealing zone and exit end, the scale being the same as that of Figure 2, the view also showing part of the discharging conveyor in elevation.

Figure 5 is a fragmentary elevation of a batt and a cross sectional view of a refractory rod on a large scale.

Figure 6 is a fragmentary side elevation of a pair of batts showing the interlocking thereof, on a scale larger than that of Figure 5.

Figure 7 is a transverse (nearly vertical) sectional view through the kiln taken on the line 7—7 of Figure 2 on the same scale as that figure.

Figure 8 is an elevation of conveyor mechanism at the entrance end of the kiln, showing the feeding conveyor and the elevator, the ram piston and ram cylinder support being shown in section.

Figure 9 is a plan view of the outer end of the feeding conveyor and of the transferrer, where the batts are transferred from the loading conveyor to the feeding conveyor.

Figure 16 is a sectional view taken on the line 16—16 of Figure 9 showing the bumper and switch support to stop the batts over the feeding conveyor as they are transferred thereto by the loading conveyor.

Figure 17 is a sectional view taken on the line 17—17 of Figure 9 showing a support for an electrical switch.

Figure 18 is a sectional view on an enlarged scale taken on the line 18—18 of Figure 8 showing the trunnion support for the transferrer actuator.

Figure 19 is a sectional view on the same scale as Figure 18 taken on the line 19—19 of Figure 8 showing another part of the transferrer actuator.

Figure 20 is a side elevation of the loading conveyor.

Figure 21 is a plan view on an enlarged scale of the loading conveyor adjacent the feeding conveyor, also showing the transferrer in dash-dot lines.

Figure 22 is a vertical sectional view taken on the line 22—22 of Figure 21, showing the feeding conveyor and elevator in full lines.

Figure 23 is a vertical sectional view taken on the line 23—23 of Figure 22 showing the transferrer and part of the actuator therefor.

Figure 24 is an hydraulic diagram including axial sectional views of the piston and cylinder charging and propelling mechanism and ram, the piston and cylinder mechanism for the elevator and the control valves for each.

Figure 1:
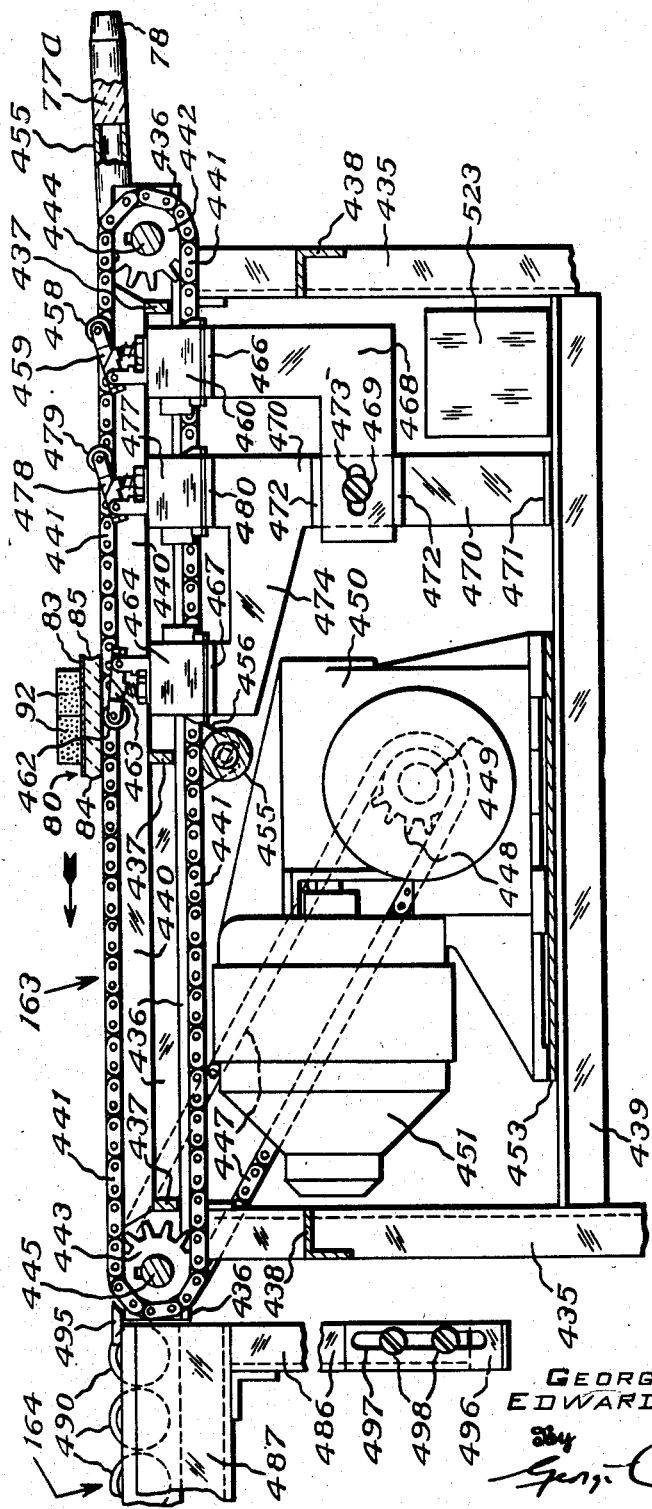
Figure 1 is a vertical sectional view of the discharging conveyor for removing the batts (which hold the ware) from the exit end of the kiln, most of the parts, however, being shown in elevation.

Referring first to Figures 2, 4 and 7 the kiln, which is generally indicated by the number 20, is mounted on a plurality of legs 21 which may be made of steel. As shown, the kiln 20 has the shape of a parallelepiped which is rectangular in cross section, but the ends need not be perpendicular to the top and bottom of the kiln 20 since it is inclined to the horizontal. The pitch of this inclination was actually about one foot in twenty-three, which is an angle of about 2°28′. Preferably it should not be much less than say 2°, nor much greater than 8°. The purpose of the downward pitch, for in Figure 2 the right hand end of the kiln is the entrance end, is to drive more of the hot gases toward the entrance end of the kiln; some gases go to the annealing zone and this is desired.

Referring again to the aforementioned figures, the kiln may comprise sheet steel bottom plates 22, sheet steel top plates 23 and sheet steel side plates 24, all fastened together to form the elongated box like structure shown by means of many angle irons 25 as well as the upper portions of the legs 21 and tie rods 26, the foregoing metal parts being bolted together or welded together or partly bolted and partly welded as desired. Referring to Figure 2, an entrance end plate 30 partly covers the entrance end of the kiln and referring to Figure 4, an exit end plate 32 partly covers the exit end of the kiln; these plates likewise are preferably made of sheet steel and may be welded to angle irons 25; they do not cover the ends of the tunnel 35.

One of the features of the invention is the relatively small size of the kiln. While it may be profitably made in much larger sizes, the kiln actually built was 23 feet, 3 inches long, measured on the horizontal, and 2 feet 7 inches square in cross section measured between the insides of the sheet metal plates. The chief reason for the legs 21 was to place the tunnel 35 high enough for working convenience, the bottom of the exit end of the kiln being 2 feet above the floor and of the entrance end being 3 feet above the floor. This kiln can vitrify wheels up to eight inches in diameter and two inches thick. For larger wheels larger kilns should be constructed.

Still referring to the same figures, the kiln 20 contains a refractory lining 36 which insulates and defines the tunnel 35. This lining may be constructed in a number of ways, but the illustrative embodiment herein illustrated is highly practical, readily constructed and easily repaired. The bottom bricks of the lining 36 have aligned pairs of rectangular grooves 48 in their upper surfaces thus forming at the bottom of the tunnel 35 a continuous groove on each side thereof extending from end to end of the tunnel, the grooves 48 being separated by ledge portions 50.

Figure 13:
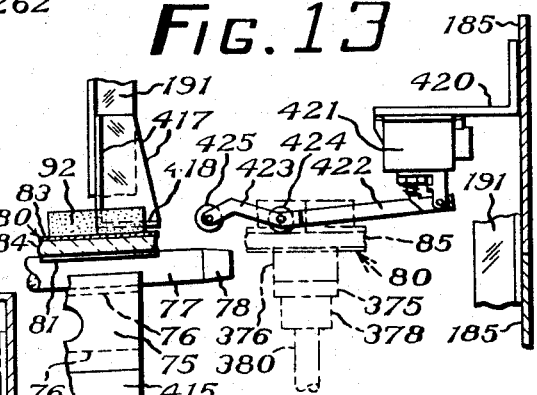
Figure 13 is a side view with certain parts shown in section taken on the line 13—13 of Figure 8, of the entrance end of the kiln, showing a batt on the elevator (in dash-dot lines) actuating an electrical switch.

Referring now to Figures 2, 4 and 7 we provide refractory supporting members 75 in the rectangular grooves 48 which collectively fill the corresponding grooves 48 from end to end of the tunnel 35. Slight gaps are left between the members 75 for expansion. Each supporting member 75 has a V groove 76 in its top and bottom. In these V grooves 76 on the upper side we place refractory rods 77 which, as best shown in Figure 13, have tapered end portions 78. The reason for the grooves 76 on the bottom of the members 75 is to make symmetrical pieces in order to avoid warping in firing or in subsequent use. Referring now to Figures 2, 4, 5 and 6 we provide ware carrying refractory batts 80 which are thin rectangular plates of refractory material having thickened ends 81 with grooves 82 on the under side extending across the batts and locating the batts on the rods 77. The upper side of each batt 80 is flat and has a layer 83 of silica. The sides of the batts 80 have respectively projections 84 and grooves 85 so that the batts are interlocked together in the tunnel 35. This keeps any batt from riding over the batt in front and also has other advantages which will be hereinafter pointed out.

The supporting members 75 and the rods 77 are preferably made of self bonded aluminum oxide. Thus they are highly refractory and resistant to wear. The batts 80 are preferably made of vitrified silicon carbide which is still more refractory and wear resistant. The silica layers 83 are formed by placing layers of silica cement on the batts and then vitrifying. These layers 83 prevent contamination of the ware, especially when the ware is made of aluminum oxide abrasive particles with ceramic bond as is frequently the case. The rods 77 are preferably ground to produce smooth accurate cylindrical surfaces and the grooves 76 are also preferably ground.

We have found that batts 80 having green wheels and partly vitrified wheels and vitrified wheels undergoing annealing in a long continuous line can be forced through the tunnel 35 by a thrust at the entrance end, and the batts stay in perfect alignment, nothing is broken and the ware is not disturbed in any way. The grooves 82 in the batts 80 by coaction with the rods 77 help to maintain the batts parallel and in alignment. The thrust is intermittent and is applied to each batt as it enters the kiln—the new batt transmits the thrust to the next in line and so on, each batt transmitting the thrust to the one in front of it until the batt at the tunnel exit end is reached, which has no batt in front of it, for batts which have passed out of the kiln are removed by automatic machinery as will be described. This means of propelling batts through the tunnel 35 is entirely successful despite the fact that no rollers or metal parts are used. The tapered end portions 78 have proved effective in preventing the batts from catching on the rods 77 despite the fact that the rods are not continuous. These rods 77 can be replaced in the tunnel 35 even when the kiln is hot, for they can be pushed along the grooves 76 and will not catch in the joints between supporting members 75. Since the rods 77 are round they have many "sides" or areas for successively taking the wear, new areas being placed uppermost merely by turning the rods. An unexpected and surprising fact about the action of the batts 80 on the rods 77 is that the wearing of the rods 77 is greater in the annealing zone than it is in the heating zone.

We provide a ram 159 to push the batts with a steady stroke of measured length. This ram may be operated by any suitable mechanism, intermittently actuated; we have found it convenient to employ a cylinder and piston unit using the city water supply for power. We further provide a feeding, conveying and transferring mechanism and while this mechanism may be varied within wide limits, a good practical apparatus which was actually used will now be described.

In Figure 20 there is shown a loading conveyor 160 upon which the batts 80 with green ware may be placed at spaced intervals, and no very accurate spacing is required. Next in line is a feeding conveyor 161 (Figure 8) which extends at right angle to the loading conveyor 160 and receives batts from it. This feeding conveyor 161 moves batts, one at a time, from the loading conveyor to an elevator 162 (see Figure 12, for example) which raises them, again one at a time, to a position in front of the ram 159. As the ram 159 operates, a batt 80 emerges from the exit end of the kiln. It lands upon a discharging conveyor 163 which moves a small distance and then stops. At the end of the discharging conveyor 163 is a roller table 164 upon which the batts with fired ware may collect until an operator removes the batts and places the fired wheels or other ware in a box for shipment to a customer.

The sequence of operation of this mechanism is as follows: During a considerable period of time (about three minutes) the ram 159, the loading conveyor 160, the feeding conveyor 161, the elevator 162 and the discharging conveyor 163 are all at rest. The ram 159 is retracted (as shown in Figure 2) and the elevator 162 is down. There is a batt 80 upon the feeding conveyor 161 just over the elevator and another batt 80 over the feeding conveyor 161 right in front of the loading conveyor 160 and there may be one or more batts 80 between these stations. There may be a number of batts with green wheels upon the loading conveyor and a number of batts with fired wheels upon the discharging conveyor 163 and possibly some upon the table 164 (depending upon the activities of the operators). Presently a timing mechanism starts the operating cycle. The elevator 162 rises and stops. The ram 159 then slowly advances pushing the new batt 80 into the entrance end of the tunnel 35 and pushing all of the batts in the tunnel a distance of the width (dimension along the tunnel) of one batt. This results in one batt 80 with fired wheels leaving the tunnel 35 whereupon the discharging conveyor 163 starts moving and then stops after having moved a short distance. All of the batts thereon are moved this distance (including the one which just emerged) and if there was one near the table 164 it slides upon it, perhaps pushing some others ahead of it.

When the ram 159 has completed its forward stroke, it retreats a full stroke. Then the elevator 162 moves down to its bottom position. Now the feeding conveyor 161 operates until the nearest batt 80 upon it has been moved to above the elevator 162, whereupon the feeding conveyor 161 stops. At this time the loading conveyor 160 operates and moves a batt with green ware over the feeding conveyor 161, whereupon the loading conveyor 160 stops. The transfer from the loading conveyor 160 to the feeding conveyor 161 is effected by the use of a transferrer or mechanical switch 165 (Figure 8). Now the various conveyors and the elevator 162 and ram 159 remain at rest for a period of time until the timing mechanism again starts the cycle.

Of the mechanisms whose action has been above outlined we shall first describe the ram 159 and its hydraulic actuating mechanism. Referring now to Figures 2, 3 and 24, the ram 159 is a disc shaped piece of metal set on edge with part of the bottom cut off and having a screw threaded hub 170 by means of which it is screwed on to the threaded end 171 of a piston rod 173 which extends through a cylinder head 174 into a cylinder 175. The cylinder head 174 has a suitable stuffing box 176 to minimize leakage, which may be tightened by a stuffing box nut 177. The cylinder 175 is further provided with a solid cylinder head 178. Channels 179 and 180 in the heads 174 and 178 respectively admit and exhaust fluid (as water) to drive a piston 181 on the rod 173. This is the mechanism for intermittently propelling the batts 80 through the kiln 20. The actuation of the piston 181 will be later described.

The cylinder 175 may be supported in any suitable manner, but as herein shown a large box structure 185 made of sheet metal has a ledge 186 which supports the cylinder head 174 while a post 187 supports the cylinder head 178. The box 185 has an open bottom and a side opening through which the batts 80 can enter; it is also open on the side facing the entrance end of the kiln tunnel 35 but extends to it and helps to keep the heat in the tunnel 35. The piston rod 173 extends through a hole in the box 185 and the ram 159 moves back and forth in the box 185 which is supported by angle iron legs 191.

Figure 20 illustrates the loading conveyor 160 and Figure 21 shows that end of the loading conveyor which is next to the feeding conveyor 161 and the transferrer 165. A plurality of angle iron legs 195 are connected by lower frame members 196 and 197 and upper frame members 198 and 199, these several frame members being horizontal. The legs 195 and some supports 200 and 201 extending upwardly from the frame members 198 and 199 respectively, support a pair of long steel girders 203. These girders 203 form the conveyor frame and they are cross connected by steel plates 204 at intervals, also by angle irons 205 at the legs 195 and the supports 200 and 201. Journalled in the girders 203 and extending between them are a plurality of rollers 210 located at evenly spaced intervals. These rollers 210 are adjustably fixed in position, and they are freely rotatable. Upon these rollers 210 rests the upper course of a long endless belt 211. Another set of rollers 215 rest upon the upper course of the belt 211. These rollers 215 which, as will be seen, are more numerous than the rollers 210, are free to move up and down within limits, but not forward and back, and they are revolved by the belt 211 whenever it moves. As shown in Figure 22, the rollers 210 and 215 are hollow metal cylinders and are journalled on ball bearings 217 supported by hexagonal shaped rods 218. The rods 218 supporting the rollers 210 are fastened to plates 219 which are fastened to the girders 203 by means of bolts 220 passing through vertical slots 221 in the girders 203. The ends of the rods 218 that support the rollers 210 are located in vertical slots (not shown) in plates 223 that are attached to the girders 203. A pair of rollers 215a and 215b shown at the right hand end of Figure 21 have reduced portions 226 at the center over which passes a belt 227 whereby the roller 215a which is driven by the belt 211 will drive the roller 215b. Otherwise these rollers 215a and 215b and their mountings are the same as the rollers 215 and their mountings.

The batts 80 with green ware are placed upon the rollers 215 with the long dimension of each batt parallel to the axes of the rollers 215. Consequently the batts will move along the loading conveyor 160 whenever the rollers 215 rotate, which is whenever the belt 211 is moved. An electric motor 230 has a reduction gear unit 231 which drives a sprocket 232 which drives a sprocket chain 233 which drives a sprocket 234 which is fastened to a large drum 235 over which the belt 211 passes. The drum 235 is journalled in journal supports 236 supported by the frame member 199 while the motor 230 and reduction gear unit 231 are supported by the frame member 197. The belt 211 passes over an idler drum 240 at the end of the conveyor 160 opposite the end where the drum 235 is located, this drum 240 being journalled in journal supports 241 supported by the frame members 198. The lower course of the belt 211 passes over idler rolls 242, 243 and 244 mounted in brackets 245, 246 and 247, the brackets 245 and 247 depending from the girders 203 and the brackets 246 being mounted on the frame members 199. The lower course of the belt 211 likewise passes under a tensioning roll 250 which is journalled in a pair of arms 251 pivotally connected to brackets 252 depending from the girders 203. A heavy weight 254 secured to the arms 251 puts tension on the belt 211. It will thus been seen that the batts 80 will move along the conveyor 160 whenever the motor 230 is energized, and will stop whenever the motor 230 stops. This motor 230 is of the type having a friction brake so that it will not coast.

The feeding conveyor 161 is shown as a whole in Figure 8 and is at the left hand end of the loading conveyor 160 as viewed in Figure 20 which is the same as the right hand end of the loading conveyor 160 as viewed in Figures 21 and 22. The kiln 20 can be seen in Figure 8 and therefore the geometrical plan arrangement of the conveyors and kiln is as follows: If the kiln 20 extends north and south and if the entrance end of the kiln is north, the loading conveyor 160 extends north and south and the green ware is gradually moved south. The feeding conveyor 161 then extends east and west and moves the green ware, by stages, west. The ware moves south through the tunnel 35 and after it is fired it moves south on the discharging conveyor 163.

Figure 10:
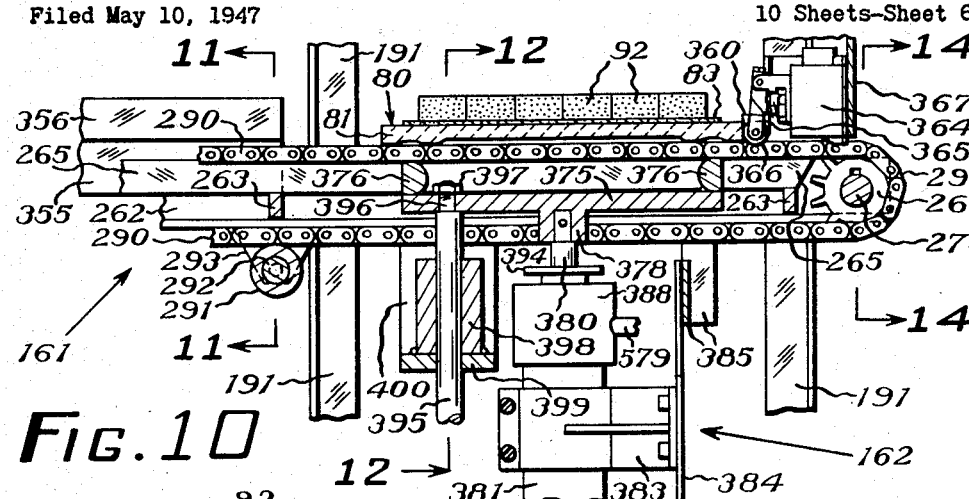
Figure 10 is a vertical sectional view of the feeding conveyor and the elevator, the section being taken on the line 10—10 of Figure 2.
Figure 11:
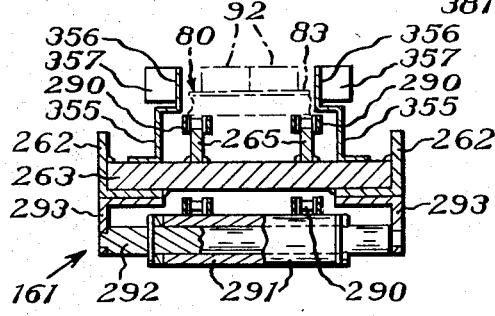
Figure 11 is a vertical cross sectional view of the feeding conveyor taken on the line 11—11 of Figure 10.
Figure 14:
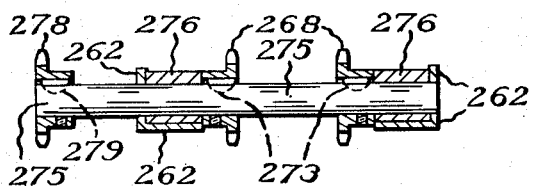
Figure 14 is an axial sectional view of the sprockets for the feeding conveyor, the section being taken on the line 14—14 of Figure 10.

Referring now to Figure 8, the feeding conveyor 161 has a pair of supporting legs 260 connected by cross members 261. These legs support girders 262 (see Figures 8, 9 and 22) which are also supported by the legs 191 that support the box structure 185. As shown in Figures 9 and 11, a number of cross members 263 tie the girders 262 together. Secured to the cross members 263 are rails 265 which are rectangular steel bars. These rails 265 stop just short of sprockets 267 and 268. The sprockets 267 are located at the left or "east" end of the conveyor 161 while the sprockets 268 are located at the right or "west" end of the conveyor 161. See Figures 9 and 10. The sprockets 267 are mounted on a shaft 270 which is journalled in journals 271 secured to the girders 262. Referring to Figures 10 and 14 the sprockets 268 are secured by keys 273 to a shaft 275 which is journalled in journals 276 secured to the girders 262. The shaft 275 extends beyond one girder 262 and has fastened thereto a sprocket 278 by means of a key 279. Referring to Figure 8, a motor 281 having a reduction gear unit 282 drives a sprocket 283 which is connected by means of a sprocket chain 284 to the sprocket 278. Therefore, when the motor 281 is energized, the shaft 275 will be revolved. The motor 281 is mounted on longitudinal frame members 287 supported by the legs 260 and 191.

Long sprocket chains 290 connect the sprockets 267 and 268 as shown in Figures 8, 9 and 10 and the upper courses of these sprocket chains 290 rest upon the rails 265. The lower courses of the sprocket chains 290 are supported by rolls 291 which, as best shown by Figure 11 are mounted on shafts 292 supported by brackets 293 secured to the undersides of the girders 262. The batts 80 are supported and moved by the chains 290, and the long dimensions of the batts 80 are parallel to the chains 290 as they rest or move thereon. In fact, if these long dimensions were east and west when the batts were placed upon the loading conveyor 160, they remain east and west on all the conveyors and in the kiln 20.

Referring now to Figures 8, 9, 16, 17, 18, 19, 20, 21, 22 and 23, and starting with Figure 22, the transferrer 165 comprises eight idler rolls 295 and mechanism to raise and lower them. Thus when the feeding conveyor 161 is about to receive a batt 80 from the loading conveyor 160, the rolls 295 are up, in which position their tops are about on a level with the tops of the rollers 215. A batt 80 is driven by the rollers 215 onto the rolls 295 and then continues to ride thereon by its own momentum until it hits a roller 296 of a switch arm 297 (see Figure 9) of a switch 298, which action stops the loading conveyor 160 and thus prevents more batts 80 from riding onto the rollers 295. Later on the rollers 295 move down and the batt 80 that was stopped by the roller 296 of the switch 298 is laid upon the sprocket chains 290 ready to be moved by them.

Referring now to Figures 22 and 23, the rolls 295 are rotatable on shafts 300 which extend between and are supported by angle brackets 301 (there being two pairs of these brackets) which in turn are supported by two steel plates 302 extending at right angles to the girders 262. The steel plates 302 are connected and supported by a steel plate 303 extending parallel to the girders 262, and the steel plate 303 is secured by a nut 304 to a vertical shaft 305, there being an aligning and supporting head 306 through which a reduced end portion of the shaft passes, the head 306 serving to support the plate 303. It will be seen that by raising and lowering the shaft 305, the eight rollers 295 of the transferrer or mechanical switch 165 are raised and lowered. It will be noted that four of the rollers 295 are between the chains 290 and the rails 265 and it is upon these four rollers that the batts are (successively) stopped right over the chains 290.

Figure 25:
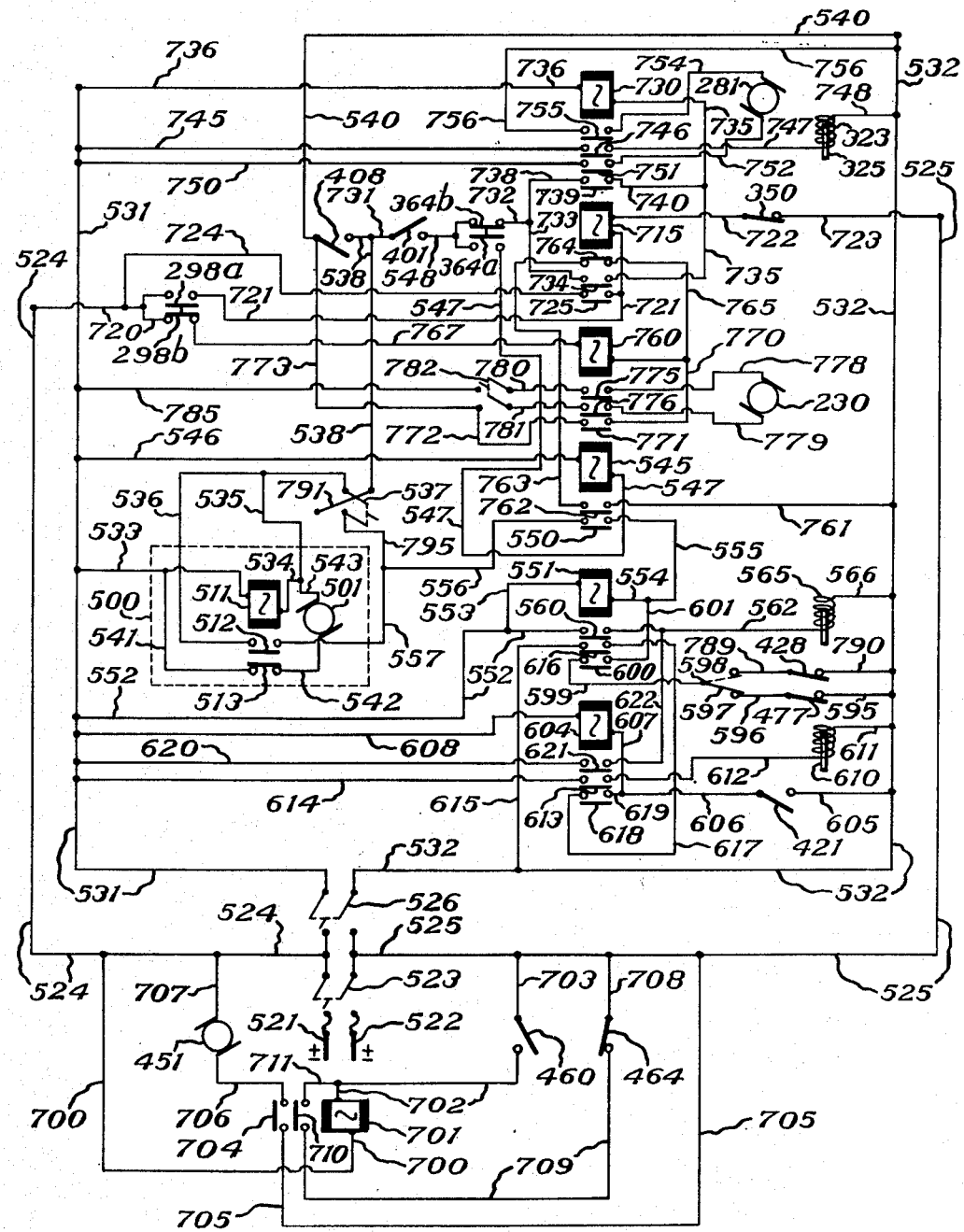
Figure 25 is an electrical diagram showing how the various switches control the conveyors, the transferrer, the elevator and the charging and propelling mechanism.

The shaft 305, as shown in Figures 22 and 23, is mounted for vertical movement in a sleeve 308 which is secured to a horizontal plate 309 the ends of which are secured to the bottom of rectangular brackets 310 secured to the undersides of the girders 262 (see also Figure 8). The bottom of the vertical shaft 305 rests against a block 312 on the end of a shaft 313 which, as best shown in Figures 8 and 25, is pivoted on a pin 314 which extends through the shaft 313, and through a spacing block 315 and a pair of brackets 316 that are secured to a cross member 317 mounted on longitudinal frame members 318 connected to the legs 260 and the nearer pair of legs 191. As shown in Figure 8 the shaft 313 extends far to the right beyond the pin 314 and has near the end thereof a weight 320 adjustably secured thereon by means of a set screw 321. This weight tends to keep the rolls 295 of the transferrer 165 in the up position, but electrical means are provided to raise the right hand end of the shaft 313 and thereby to lower the rolls 295.

Referring now to Figures 8 and 19, a solenoid coil 323 is attached to a pair of cross members 324 which are supported by the longitudinal frame members 318. An iron core 325 in this solenoid coil 323 has non-magnetic extensions 326 between which is secured, by means of a bolt 327, a block 328 having a slot 329 through which the rod 313 extends. When the solenoid coil 323 is energized, the iron core 325 is raised, which raises the extensions 326 and the block 328, which raises the right hand end of the shaft 313 thus lowering the block 312 thus lowering the transferrer 165. This action switches the batt 80 that is on the rolls 295 to the chains 290 of the feeding conveyor 161.

Referring now to Figure 9 the roller 296 and a spring 330 acting against the switch arm 297 act as a bumper to stop the moving batts 80 but it is advisable to have a pair of bumpers to avoid skewing of a batt. Consequently we provide a block 331 secured to the girder 262, the block 331 containing a spring 333 which acts on a rod 334 which bears against an arm 335 pivoted to a bracket 336 extending from the block 331, the arm 335 having a roller 337 which is contacted by a batt 80. Referring to Figure 22, the block 331 is secured to a plate 341 which is welded to a vertical plate 342 fastened to the girder 262. Referring to Figure 16, the casing of the switch 298 is secured to an angle iron bracket 343 which is secured to a T-member 344 fastened to the girder 262. Referring to Figure 17, a bracket 348 having a horizontal portion 349 supports a switch 350, the bracket 348 being secured to the underside of the girder 262. As shown in Figure 9 this switch 350 has a switch arm 351 supporting a roller 352 which is contacted by a batt 80 as it moves over the switch 350. The purpose of this switch 350 will be hereinafter described.

Although the batts 80 should successively be placed upon the chains 290 perfectly parallel thereto and with part of each batt upon each chain, by reason of the mechanism above described, nevertheless as an additional precaution which is remarkably effective in keeping the entire apparatus running without any catastrophes, we provide alignment and equalizing mechanism which operates to straighten the batt upon the feeding conveyor 161 and/or to move them sideways so that an equal area of each batt will be upon each chain 290. Referring now to Figures 8 and 11, fastened to the cross members 263 are sheet metal guides 355 which as shown have the cross-sectional shape of stairs; the top vertical portion 356 does the guiding and the leading ends of the guides are bent outwardly to form cams 357 which straighten out the batts and center them as they move along the feeding conveyor 161.

Figure 15:
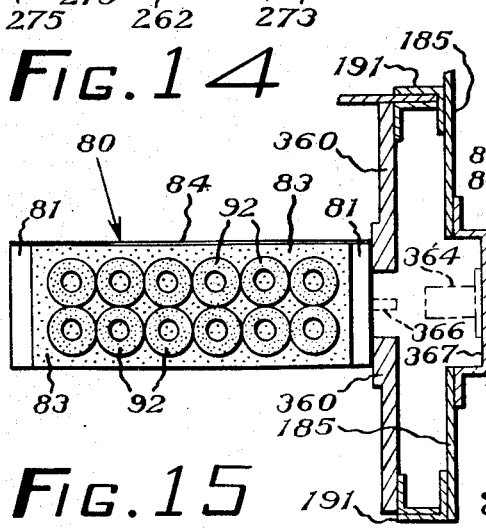
Figure 15 is a sectional view on an enlarged scale taken on the line 15—15 of Figure 2 showing the bumper to stop the batts on the feeding conveyor in position to be picked up by the elevator.

It is important to stop each batt 80 when the feeding conveyor has moved it that precise distance which puts it directly above the elevator 162, and it is likewise important to stop the feeding conveyor at this moment so that another batt 80 will not run into the batt that is at the elevator station. Referring now to Figures 2 and 15, we provide bumper arms 360 secured to the legs 191 which bring the batts successively to a positive stop without rebound and we further provide (see now also Figure 10) a switch 364 having a switch arm 365 with a roller 366 to stop the feeding conveyor 161. The switch 364 may be secured to a panel 367 that is fastened to the box 185.

Figure 12:
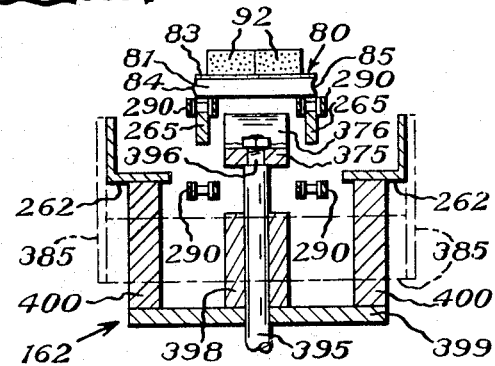
Figure 12 is a vertical cross sectional view of the elevator taken on the line 12—12 of Figure 10.

The elevator 162 is best shown in Figures 3, 10 and 12 and the hydraulic mechanism to actuate it is shown in Figure 24. Referring now to Figure 10, the elevator 162 comprises a horizontal plate 375 having on the ends thereof batt supports 376 with rounded tops. These batt supports 376 contact the batts 80 in the grooves 82. When the elevator plate 375 is up, the ram 159 can move between the supports 376 and thrust a batt 80 onto a pair of the rods 77, which project into the box 185 as shown in Figure 2. The elevator plate 375 has on the lower side thereof a boss 378 in which is located and fastened the upper end of a piston rod 380 which extends into a cylinder 381.

The cylinder 381 is fastened by means of clamps 383 to an upright frame member 384 that is connected by a bracket 385 to the girder 262 and by an angle iron 386 to the longitudinal frame member 287. Referring to Figure 24, the cylinder 381 has a solid cylinder head 387 at one end and a bored cylinder head 388 at the other end through which the piston rod 380 passes. In these heads are channels 389 and 390 respectively. By admitting and exhausting fluid such as water by way of the channels 389 and 390, a piston 392 on the piston rod 380 is moved in the cylinder 381 thereby raising and lowering the horizontal elevator plate 375. The bored cylinder head 388 has a stuffing box 393 tightened by a stuffing box nut 394.

Referring now to Figures 10 and 12, a rod 395 has a screw threaded portion 396 by means of which and a nut 397 it is fastened to the plate 375 near one batt support 376. This rod 395 passes through a sleeve 398 which is secured to a plate 399 that is fastened to vertical members 400 secured to the undersides of the girders 262. This construction keeps the elevator plate 375 from turning as it moves up and down and the rod 395 is likewise used to actuate a switch 401 (Fig. 8). As shown in Figure 8, the switch 401 has a switch arm 402 at the end of which is a roller 403 which is contacted by the end of the rod 395 when the elevator 162 is down. This switch 401 sets in operation the feeding conveyor 161.

The return of the ram 159 sends the elevator 162 down. As shown in Figure 2, on the upper side of the ram 159 is a fixed arm 405 which contacts a roller 406 on a pivoted arm 407 of a switch 408 fastened by a bracket 409 to the legs 191 inside of the box 185. This switch 408 initiates downward movement of the elevator 162. In order that the ram 159 shall not turn by turning of the piston 181 in the cylinder 175, we provide a pair of guides 410 fastened to the box 185 which contact the flat bottom of the ram 159 and straighten it out whenever it has started to turn.

It will be noted that the contact and supporting portions of the batt supports 376 are horizonal, see for example Figure 12. At least they were made that way but use soon puts a crown to these surfaces in a longitudinal direction since the batts 80 are abrasive. It will also be noted that the ram 159 moves parallel to the axis of the tunnel 35 but this axis is on an incline and the batts 80 are substantially horizontal when they are on the elevator 162. Referring to Figure 2, a pair of bricks 415 are supported by the kiln 20 at the entrance end of the tunnel 35, and these bricks 415 support refractory members 75 which support rods 77 that extend well into the box 185. The angular relationship of the parts is such that the tapered end portions 78 of these first rods 77 are about horizontal on top. We have found that the batts go very nicely onto the rods 77 and into the tunnel 35 with this mechanical construction and actuation despite the fact that there is a slight change of direction and some resultant force normal to the plane of the rods 77. As a safety precaution, however, we provide, referring to Figures 8 and 13, hold down members 417 which may be shaped like an angle iron with a bottom portion 418 perpendicular to the apex of the angle, for the purpose of preventing the batt 80 thereunder from rising during the stroke of the ram 159. It has been found that if the batt 80 just entering the tunnel 35 is kept down, there will be no trouble with the batts ahead of it and it has been further found that under these conditions the batt which is being pushed by the ram will not rise either. However most of the time there is not even any contact between the bottom portion 418 and the batt under it.

Referring to Figure 13, in the box 185 and attached to it by a bracket 420 is a switch 421. This switch 421 has a long pivoted arm 422 with a hump 423 at the end thereof, and at the ends of the hump 423 are located rollers 424 and 425. When the elevator 162 rises, the batt 80 thereon hits the roller 424 and thereby moves the arm 422 and actuates the switch 421. This starts the ram 159 moving. By reason of the combination of the rollers 424 and 425, the switch arm 422 remains up until the ram 159 has gone practically all the way forward. The rollers 424 and 425 ride upon the batt 80 as it moves out under them.

Referring now to Figure 2, a switch 428 is fastened by means of a bracket 429 to the inside of the box 185 and has a pivoted arm 430 with a roller 431 which is contacted by the lower flat side of the ram 159 at the end of its forward stroke. This switch 428 is used when loading the kiln with empty batts pursuant to starting it in operation as will be hereinafter more clearly explained.

The discharging conveyor 163 is shown in Figures 1 and 4. It is a type of conveyor like the feeding conveyor 161 but any of the conveyors could be of this type or of the type disclosed in the description of the loading conveyor 160, or other types of conveyors could be used for any of the three used in this invention. Referring now to Figures 1 and 4 a pair of legs 435 at each end support a pair of girders 436 which are cross connected by members 437. Cross braces 438 parallel to the members 437 connect the legs 435 and longitudinal angle iron frame members 439 perpendicular to the braces 438 likewise connect the legs 435. Supported by the cross connecting members 437 are a pair of rails 440 upon which ride the upper courses of sprocket chains 441 extending between a pair of sprockets 442 at the kiln end of the discharging conveyor 163 and a pair of sprockets 443 at the far end of the conveyor. These sprockets 442 and 443 are respectively mounted on shafts 444 and 445 which are journalled in the girders 436. An outside sprocket (not shown but identical with the sprockets 442 and 443) is keyed to the shaft 445 and the sprockets 443 are likewise fastened to this shaft which is thereby driven with the aid of a sprocket chain 447 extending from a sprocket 448 on the shaft 449 of a reduction gear unit 450 which is connected to a motor 451, the unit and the motor having connected casings. This motor and reduction gearing combination is mounted on a plate 453 which rests upon the frame members 439. The lower courses of the sprocket chains 441 rest upon a roller 455 journalled in brackets 456 which are attached to the girders 436.

Thus whenever the motor 451 is energized the pair of chains 441 will be moved at a slow speed, and the upper courses of these chains move to the left in Figures 1 and 4. Any batts 80 which are resting upon the chains 441 are thereby moved to the left, and this discharging conveyor 163 is positioned to receive batts 80 discharged from the tunnel 35.

Referring to the same figures, the final rods 77a resting on the members 75 in the tunnel 35 are cut off and abutting them are pipes 455 which are welded to the girders 436. The pipes 455 thus constitute continuations of the rods 77a and the rods 77, and the batts 80 can ride right onto the chains 441 and be propelled along the chains by the driving force imparted by the ram 159. When, however, a batt 80 contacts a roller 458 of a switch arm 459 of a switch 460 the motor 451 is energized and the chains 441 start to move. This carries the batt 80 which hit the roller 458 along until it hits another roller 462 on an arm 463 of a switch 464 which stops the motor 451. The conveyor 163 picks up only one batt 80 at a time from the kiln 20 since there is not room for two batts on the chains 441 back of the switch roller 458.

The switch 460 is mounted on a plate 466 which is located in between the girders 436 and the chains 441. The switch 464 is mounted on a plate 467 likewise centrally located. The plate 466 is welded to the top of an angle bracket 468 which is secured by a screw 469 to an upstanding bracket 470 that is welded to a cross plate 471 resting on top of and secured to the angle iron frame members 439. Projecting guides 472 on the bracket 470 keep the angle bracket 468 from sagging and a slot 473 through which the screw 469 passes provides for adjustment of the switch 460 and its roller 458 longitudinally. An arm 474 of the bracket 470 provides a support for the plate 467, the plate being welded to the arm.

There is a third switch 477 centrally located between the chains 441 and between the switches 460 and 464. This switch 477 starts the ram 159 moving back. It has an arm 478 with a roller 479 which is contacted by a batt 80 as the batt moves over the roller. The switch 477 is mounted on a plate 480 which is welded to the top of the upstanding bracket 470.

We may further provide a batt collecting table 164 to collect the batts 80 as they are moved off the discharging conveyor 163, though the same result would be achieved by making the conveyor 163 long enough and providing a bumper at the end. The ware 92 may be picked off the batts 80 while they are on the conveyor 163 at any time provided the ware 92 is cool enough to be handled with or without gloves. As the ware 92 is picked off it is packed in boxes for shipment or inventory storage and the batts are returned to the loading end for reloading with green ware to be placed on the loading conveyor 160. The collecting table 164 comprises legs 486 (four or more of them but only one shown) to which are secured girders 487 connected by cross members (not shown) and supporting rollers 490 which may be like the rollers 215 and similarly mounted. Gap bridging members 495 similar in function to the pipes 455 are welded to the girders 487 and hold the batts at the gap between the chains 441 and the first roller 490. The table 464 may be as long as desired and the batts 80 just roll out onto it until so many have collected that the chains 441 can no longer drive them ahead, whereupon they back up on the discharging conveyor 163. This combination of discharging conveyor 163 and collecting table 164 affords adequate time for the batts 80 and the ware 92 to cool enough so that they can be handled with bare hands.

Figure 1 shows an adjusting bracket 496 for the legs 486 whereby the height of the table 164 may be adjusted and it may be levelled despite inequalities in the floor of the building, or it may be slightly inclined if desired. The brackets 496 have long slots 497 through which extend screws 498 fastening the legs 486 to the brackets. This adjustable support feature may be adopted for any or all of the legs of the various conveyors and the kiln 20.

Referring now to Figure 25, we provide an adjustable timer 500 of any appropriate design involving a motor 501 and a resettable arm connected to the motor and reduction gearing by a gear moved into and out of mesh by an electromagnet, with a trip device actuated by the arm and a clock spring to return the arm. Many such devices are on the market and therefore no drawings of such timer 500 are herein provided. The one actually used was a Sangamo timer, model 15, form 61—S1 115 volts 60 cycles 10 amperes, made by the Sangamo Electric Company of Springfield, Illinois. The timer 500 may be mounted in a box 510 on one of the frame members 318, see Figure 8.

As part of the timer 500 there is an electromagnet 511 which, when energized, moves the gear into mesh and endeavors to close a switch 512 and open a switch 513, but the trip device of the timer prevents the latter two until it is operated by the arm of the timer, which is moved by the motor 501 through the reduction gearing of the timer.

There is a period of time when all the conveyors, the ram 159, the elevator 162 and the transferrer 165 are stationary but the motor 501 is running. There should then be a batt 80 above the elevator 162 as shown in Figure 10. At this time the electromagnet 511 is energized, but the switch 512 remains open and the switch 513 remains closed because they are held by the latch of the timer.

Referring now to Figure 25, the electric power may be provided by main power lines 521 and 522. These lines 521 and 522 are connected by a main disconnect hand switch 523 to main lines 524 and 525 which in turn are connected by a hand switch 526 to main lines 531 and 532. The electromagnet 511 is energized by a branch line 533 from the line 531, a line 534, a line 535 and a line 536 to a double throw hand switch 537, then a line 538 to the switch 408, then by a branch line 540 to the other main line 532. The motor 501 is energized by branch line 533, line 541, switch 513, line 542 and short line 543 to the line 535, then to the power line 532 as above stated. It will be seen that the ram 159 has to be fully retracted and holding the switch 408 closed for the timer motor 501 to operate.

Finally the timer latch is tripped by the timer arm operated by the motor 501. Then the electromagnet 511 closes the switch 512 and opens the switch 513. This stops the motor 501 but the timer does not reset because the gear is held in engaged position by the electromagnet 511 and the timer clockspring is not strong enough to run the motor back through the reduction gearing. The timer will, however, reset whenever the electromagnet 511 is deenergized, which occurs when the switch 408 is opened by forward movement of the ram 159.

At this time the elevator 162 is down so the switch 401 which is a normally open switch is closed. There is a batt 80 above the elevator 162 which is against the roller 366. As illustrated in Figure 25, the switch 364 has a normally open switch element 364a and a normally closed switch element 364b. With the batt 80 against the roller 366, the switch element 364a is closed and the switch 364b is open. This provides a circuit to energize a relay 545 as follows: main line 531 by a branch line 546 to relay 545, then by a line 547 to switch element 364a and by a line 548 to switch 401 to switch 408 to branch line 540 to main line 532.

The relay 545 being energized, it closes a switch 550 which energizes another relay 551 as follows: from main line 531 by a branch line 552 to a line 553 to relay 551, by a line 554 and a line 555 to the switch 550, by a line 556 to a line 557 to the switch 512 to line 536 which is connected to the main line 532 as aforesaid.

This causes the elevator 162 to rise. The relay 551 closes a switch 560 which connects the branch line 552 to a line 562 which is connected to a solenoid 565 that is connected by a branch line 566 to the main line 532, thus energizing the solenoid 565.

Referring now to Figure 24, the solenoid 565 operates a valve member 567 in a casing 568 against a spring 569. A pipe 570 may be connected to the city water supply and has a reducing valve 571 for regulating the effective water pressure. Pipe 570 is connected by a T union to a pipe 573 which leads to a valve port 574. The valve member 567 has two reduced portions 575 and 576. When the solenoid 565 is deenergized, the reduced portion 576 connects the port 574 to a port 577. Port 577 is connected by a pipe 578 and a pipe 579 to the channel 390 of the cylinder head 388. The pipes 578 and 579 are connected by parallel pipes 580 and 581 in the first of which is a check valve 582 and in the second of which is a hand operated valve 583. It will readily be seen that with the valve member 567 down, as shown, the piston 392 and the elevator 162 must move down or stay down.

The channel 389 of the cylinder head 387 is connected by a pipe 585 to a port 586 in the casing 568. With the valve member 567 down, the port 586 is connected by the reduced portion 575 to a port 587 that is connected by a pipe 588 to a pipe 589 having a check valve 590. The pipe 589 is connected by a T union to a pipe 591 that may lead to the sewer or any other waste or discharge. A pump and oil reservoir may be substituted for the city water supply if desired, but the latter has been found quite adequate and convenient. Where the apparatus was actually operated the city water pressure was about eighty pounds to the square inch.

When the solenoid 565 is energized, the valve member 567 is raised, and this causes the reduced portion 575 to connect the pressure port 574 to the port 586 that is connected to the pipe 585 leading to the channel 389 in the cylinder head 387 at the bottom of the cylinder 381. This causes the piston 392 to rise, moving the elevator 162 up, and the up stroke of the elevator may be regulated by valve 583. Water exhausts from the cylinder 381 by way of the channel 390, pipe 579, pipe 581 having valve 583, pipe 578, port 577, reduced portion 576 to a port 592 connected to a pipe 593 that connects to the pipe 589 having the check valve 590, the water discharging to the sewer, etc., through the pipe 591.

It will be seen that the upstroke of the elevator 162 may be regulated by the hand operated valve 583 because the fluid can not move out through the check valve 582. However the down stroke of the elevator 162 is not so regulated because the fluid can move in through the check valve 582. This is a desirable feature because on the up stroke the elevator is carrying a batt 80 loaded with green (hence somewhat fragile) wheels 92, but on the down stroke the elevator 162 is carrying no ware and the stroke may be fast.

Referring again to the wiring diagram Figure 25, the switch 477 in the discharging conveyor 163 is connected by a branch line 595 to the main line 532. The other end of the switch 477 which is normally closed is connected by a line 596 to a two way hand operated switch 597 the switch pivot terminal 598 of which is connected to a line 599 that is connected to a switch 600 operated by the relay 551. The switch 600 is further connected by a line 601 to the line 554 which goes to the relay 551. Thus when the relay 545 is deenergized the above holding circuit nevertheless keeps the relay 551 energized. The relay 545 is in fact deenergized when the elevator 162 moves up a short distance, because this action breaks the circuit to relay 545 at the switches 401 and 364a.

When the elevator 162 arrives at its top position, a batt 80 thereon hits the roller 424 which closes normally open switch 421. This energizes a relay 604 in the following manner: switch 421 is connected by a branch line 605 to the main line 532. Switch 421 is likewise connected by a line 606 to a line 607 connected to the relay 604. The other end of the relay 604 is direct connected by a branch line 608 to the main line 531.

Energization of the relay 604 starts the ram 159 to propel the batt 80 on the elevator 162. This occurs through energization of a ram operating solenoid 610 which is energized as follows: a branch line 611 connects the solenoid 610 to the main line 532 while the other end of the solenoid 610 is connected by a line 612 to a switch 613 operated by the relay 604, the other end of the switch 613 being connected by a branch line 614 to the main line 531.

It is desirable that once the ram has started it shall not retreat until the batt with green ware has been moved off the elevator 162 and a batt with fired ware has emerged from the kiln onto the discharging conveyor 163. The elevator 162 should not go down while a batt is partly on it because this might spill the green ware off the batt or cause a jam when the next batt is raised. On the other hand the cycle should not go on unless a batt is emerging from the kiln at the right moment in the cycle. Also the relay 604, once energized, should continue to be energized even after the switch 421 is opened. Furthermore the elevator 162 should be maintained in its up position while the ram 159 is moving forward, otherwise the ware will be spilled. For these purposes we provide a holding circuit for relay 604 and certain interconnections between relays 551 and 604 and the elevator solenoid 565 which will now be described.

A branch line 615 connects one end of a switch 616 operated by the relay 551 to the main line 532. The other end of the switch 616 is connected by a line 617 to a switch 618 which is connected by a short line 619 to the line 607. The switch 618 is operated by the relay 604, and thus a holding circuit for the relay 604 is established which will not be broken so long as the relay 551 remains energized. A branch line 620 connects a relay 604 operated switch 621 to a line 622 which is connected to the line 562 that is connected to the solenoid 565 controlling the elevator 162. Thus if the relay 551 should fail the elevator 162 nevertheless remains up.

When the switch 421 opens up which is supposed to happen when a batt 80 has been pushed so far forward that it leaves the second roller 425, the making circuit for the relay 604 is broken. Nevertheless the above described holding circuit for the relay 604 is still maintained until the switch 477 is opened by a batt 80 emerging from the kiln. If these events occur in reverse order to the above, the relay 604 is kept energized until the switch 421 is opened. But when both switches 421 and 477 are opened, the relay 551 is deenergized so the holding circuit for relay 604 is broken and it also is deenergized. Now the circuits for both of the solenoids 565 and 610 are broken and the ram 159 retreats while the elevator 162 goes down.

The ram 159 is governed by the solenoid 610 in that the ram 159 moves forward or stays in its furthest forward position so long as the solenoid 610 is energized. Just as in the case of the elevator 162, the active or forward stroke of the ram takes place at a controlled rate of speed determined by the setting of a valve, while the return is rapid. Referring now to Figure 24, the hydraulic system to operate the piston 181 in the cylinder 175 is identical with the hydraulic system to operate the piston 392 in the cylinder 381 so the description will not be repeated. The same numbering system is used for the various parts, pipe lines, ports and valves, in the six hundred series however instead of the five hundred series. Thus the main valve member operated by the solenoid 610 is valve member 667 and so on to the exhaust pipe 693. Certain parts are in common, as will readily be seen from Figure 24, for example the water supply pipe 570, the hand operated valve 571 and the pipe 591 leading to the sewer. The valve 571 provides means for regulating the return stroke of both pistons 392 and 181 so that the apparatus will not be damaged by too rapid descent of the elevator 162 or retreat of the ram 159.

We may provide pressure gauges for the hydraulic system such as the gauge 695 in the line 685 and the gauge 696 in the line 679 to check the pressure. These are in the system for the ram 159 as it is important to control the movement of this ram, but the gauges also give information which applies to the operation of the elevator as well. We may also provide a pipe 697 with a pet cock 698 to drain the water from the pipe 685 in order to clear the line of air bubbles, and similar provision may be made for any other of the pipes but the system operates very well as shown.

As shown in Figure 8, the valve casing 568 and its counterpart 668 which support the similar solenoids 565 and 610 are supported by brackets 699 attached to the side of a leg 191.

Referring again to Figure 25, when the ram 159 goes forward, the switch 408 is opened. This breaks the circuit energizing the timer electromagnet 511. The moveable gear in the timer is therefore unmeshed and the clockspring of the timer returns the timer arm to an adjustable stop which determines the time interval of the timer. Deenergization of this timer magnet 511 also permits the switch 413 to close and the switch 512 to open, under the influence of a spring the same as in all the relay operated switches hereof. The latch of the timer locks these switches, 512 open and 513 closed, and will hold them so until the arm of the timer next releases the latch. By the closing of switch 513 the circuit for the timer motor 501 is reestablished excepting that the switch 408 is open. Therefore, with the return of the ram 159 which closes the switch 408, not only is the electromagnet 511 reenergized, but the timer motor 501 is restarted. For clarity these circuits will now be repeated: right hand top of Figure 25, branch line 540 takes current from the main line 532 and goes to the switch 408, line 538 takes the current from the switch 408 to the hand switch 537 which should be closed to the right, line 536 takes the current to the line 535 which branches into lines 534 and 543, the former leading to one side of the electromagnet 511 and the latter leading to one side of the motor 501. The circuit is completed to the electromagnet 511 by branch line 533 from the main line 531, and the circuit is completed to the motor 501 by the branch line 533, line 541, switch 513 and line 542. The timer will now measure the desired time interval while further events of the operating cycle continue. These further events will have taken place and the kiln mechanism will be at rest before the timer arm again starts the cycle by tripping the latch to close the switch 512.

It will be remembered that there are two switches 460 and 464 in the discharging conveyor 163 which control it. Referring now to the lower part of Figure 26, a branch line 700 connects a relay 701 to the main line 524. The other end of the relay 701 is connected to the switch 460 by means of a line 702 while the other end of the switch 460 is connected to the main line 525 by means of a branch line 703. Thus when the switch 460 is closed by a batt 80 emerging from the tunnel 35, the relay 701 is energized. This action closes a switch 704 which is connected by a branch line 705 to the main line 525, the other side of the switch 704 being connected to the motor 451 by a line 706, and the other side of the motor 451 being connected to the main line 524 by a branch line 707. Thus, energization of the relay 701 responsive to closing of the switch 460 causes energization of the motor 451, and the discharging conveyor 163 starts to operate.

It is the action of the discharging conveyor 163 which moves a batt 80 into contact with the roller 479 of the normally closed switch 477 but the switches 460 and 477 are so close together that there is little lapse of time between the closing of the switch 460 and the opening of the switch 477. Now, however, the batt 80 has left the switch 460, so it automatically opens. This however does not deenergize the relay 701 for the following reason: a branch line 708 connects the switch 464 (which is normally closed) to the main line 525, while a line 709 connects the other end of the switch 464 to a switch 710 which is operated by the relay 701. The other side of the switch 710 is connected by a line 711 to the line 702 and therefore to the relay 701. In that way current keeps flowing to the relay 701, for the other side thereof is permanently connected to the main line 524 by the branch line 700.

Now when the batt 80 which just came onto the discharging conveyor 163 hits the roller 462 the switch 464 is opened and this action opens the holding circuit of the relay 701, which goes dead, so the switch 704 is opened and therefore the conveyor motor 451 stops. When the next batt 80 restarts the conveyor 163 the old batt 80 is moved off the roller 462 of the switch 464 thus allowing it to close and this happens before the switch 460 opens. The reason is there is a slight coasting of the conveyor 163 after the energy is cut off—preferably the motor 451 has no automatic brake. The coasting of the motor 451 and the conveyor 163 could be great enough to carry the batt 80 right off the roller 462 of the switch 464, because once the holding circuit is broken, reclosing of the switch 464 will not restart the conveyor.

It will be remembered that after the ram 159 has retreated, due to deenergization of the solenoid 610 and the elevator 162 has gone down, due to deenergization of the solenoid 565, the feeding conveyor operates to carry a new batt 80 over the elevator 162. We provide a relay 715 which is alive at this time for the following reason: in the previous operation of the kiln a batt struck the roller 296 of the switch 298 and operated it. This switch 298 has a normally open switch element 298a and a normally closed switch element 298b. When actuated the element 298a closes a circuit and the element 298b opens a circuit. By the closing of the element 298a a circuit is established through the relay 715 to energize it in the following manner. A branch line 720 is connected to the main line 524 and goes to one side of both of the switch elements 298a and 298b. A line 721 goes from the other side of the switch element 298a to the relay 715. The other side of the relay 715 is connected by a line 722 to one side of the normally closed switch 350 which is mounted part way out in the feeding conveyor 161. A branch line 723 connects the other side of the switch 350 to the main line 525. Thus the relay 715 is energized when a batt 80 strikes the roller 296. A holding circuit is provided for this relay 715 in case the batt 80 bounces back. A line 724 connected to the branch 720 bypasses the switch 298 going to a switch 725 operated by the relay 715. The other end of the switch 725 is directly connected to the line 721 and thus the holding circuit is established.

This relay 715 remains energized while the feeding conveyor 161 is stationary since the only switch to open the holding circuit is the normally closed switch 350 which is only operated by a batt 80 moving on the feeding conveyor 161. Now when the ram 159 has retreated the full length of its stroke, it closes the switch 408. When the elevator 162 has moved to the bottom it closes the switch 401. When there is no batt over the elevator the switch element 364b is closed because it is a normally closed switch. These three switches being closed establish that conditions are right for the feeding conveyor 161 to move. The first step is automatic energization of a relay 730 as follows.

The branch line 540 leads to the switch 408 and the switch 408 is connected to the switch 401 by part of the line 538 and by a short line 731. The switch 401 is connected to switch element 364b which is connected by a line 732 and a line 733 to a switch 734 operated by the relay 715. The other side of the switch 734 is connected by a line 735 to the relay 730 the other side of which is connected by a branch line 736 to the main line 531.

Immediately the relay 730 is energized it establishes a holding circuit for itself. This is by way of a line 738 connecting the line 732 to a switch 739 operated by the relay 732, the other side of the switch 739 being connected by a line 740 to the line 735.

Energization of the relay 730 closes circuits to the solenoid 323 which operates the transferrer or mechanical switch 165 and to the motor 281 which drives the feeding conveyor 161. From main line 531 a branch line 745 runs to a switch 746 operated by the relay 730, and from the other side of the switch 746 a line 747 runs to the solenoid 323 which is also connected by a branch line 748 to the main line 532. From main line 531 a branch line 750 runs to a switch 751 operated by the relay 730, and from the other side of the switch 751 a line 752 runs to the motor 281. From the other side of the motor 281 a line 754 runs to a switch 755 also operated by the relay 730, and the other side of the switch 755 is connected to the main line 532 by a branch line 756.

It will be seen that the transferrer 165 and the feeding conveyor 161 start practically simultaneously. The transferrer 165, when operated, gently lowers the batt which is resting upon it onto the chains 290 of the feeding conveyor 161. These chains 290, since the motor 281 was energized, move the batt 80 that was just deposited upon them which soon trips the normally closed switch 350. This action deenergizes the relay 715 and opens its holding circuit through the switch 725. The relay 730, however, remains energized by its holding circuit through the switch 739, so the motor 281 keeps running. As the batt 80 moves off the roller 352 of the switch 350 this switch closes. The feeding conveyor 161 keeps running until a batt 80 thereon (not necessarily the same one that was just lowered by the transferrer 165 but possibly so) hits the roller 366 of the switch 364, which opens the switch element 364b and closes the switch element 364a. Opening of the switch element 364b cuts both the making circuit and the holding circuit of the relay 730 and thereupon the conveyor 161 stops and the transferrer 165 rises ready to receive a batt from the loading conveyor 160. As previously stated there may be only one batt on or above the feeding conveyor 161 after the elevator 162 has gone up and the loading conveyor 160 has operated, or there may be several. Care should be taken, however, that there are not so many batts on the feeding conveyor 161 that one comes to rest on the roller 352 of the switch 350 thus keeping it open, since this switch should be closed by the time the feeding conveyor 161 comes to a stop to permit the kiln to operate for the following cycle.

When a batt 80 strikes the roller 366 of the switch 364 it closes the switch element 364a at the same time that it opens the switch element 364b as above described. This, as above stated, stops the feeding conveyor 161 and raises the transferrer 165 which is now ready to receive a new batt 80 from the loading conveyor which is now to operate. The batt 80 which hit the roller 366 is right above the elevator 162 ready to be lifted in the next cycle.

When the switch element 364a closes, current can run from main line 532 via branch line 540, switch 408, part of line 538, short line 731, switch 401, line 548, switch 364a, line 547 to the relay 545, then by the branch line 546 to the main line 531. This energizes the relay 545 and there is no holding circuit because if the batt 80 over the elevator is not in just the right position it is desired that the cycle be stopped by the opening of the switch 364a.

Energization of the relay 545 causes, at this time, energization of a relay 760 as follows: a branch line 761 is connected to the main line 532 and to a switch 762 operated by the relay 545. A line 763 goes from the other side of the switch 762 to a switch 764 controlled by the relay 715. This switch 764 is a normally closed switch contra to all the other relay switches which are normally open switches (except that magnet 511 switch 513 is also normally closed). From the other side of the switch 764 a line 765 leads to the relay 760. The other side of the relay 760 is connected by a line 767 to the switch element 298b which is now closed because there is no batt 80 on the transferrer 165. As previously stated the switch element 298b is connected by line 720 to the main line 524, so the circuit through the relay 760 is complete. In this case the circuit is from main line 532 to main line 524 but this is a good power circuit and when the hand switch 526 is opened the circuit will be broken.

Relay 760 has a holding circuit using line 720, switch 298b, line 767 and part of line 765, the remainder being a line 770, a relay switch 771, a line 772, a line 773 and the branch line 540.

Relay 760 operates the motor 230 which runs the loading conveyor 160. As shown a pair of relay 760 operated switches 775 and 776 connect to lines 778 and 779 respectively leading to the two sides of the motor 230. The other sides of the switches 775 and 776 are respectively connected by lines 780 and 781 to a two pole hand switch 782 which is normally closed and connects line 780 to a branch line 785 and line 781 to the line 773. The branch line 785 is connected to the main line 531 so the circuit is complete and the loading conveyor starts.

Now all the batts 80 on the loading conveyor 160 are moved (south) towards the feeding conveyor 161. The foremost of them is pushed onto the idler rolls 295 of the transferrer 165 and then continues by momentum striking the bumper roller 337 and the switch roller 296 which stops the foremost batt 80 closes the switch element 298a and opens the switch element 298b. The latter action cuts both the making circuit and the holding circuit of the relay 760 and so the motor 230 stops as the switches 775 and 776 open. Thus the loading conveyor 160 is stopped. It will not start up again till the next cycle even if the batt 80 rebounds and allows the switch 298b to close because the switch 298a closes the circuit to the relay 715 whose holding circuit through switch 725 is immediately reestablished, and the energized relay 715 opens the switch 764 which is in the making circuit for the relay 760.

This completes the cycle and all of the conveyors, the transferrer 165, the elevator 162 and the ram 159 remain at rest while the timer motor 501 continues to operate slowly moving the timer arm until it finally trips the latch of the timer which allows the live electromagnet 511 to close the switch 512 which, because the relay 545 is alive and the switch 408 is closed, energizes the relay 551 which starts the elevator 162 moving up and the cycle repeats. Thus all the operators have to do is to place batts 80 with green wheels 92 or other ware on the loading conveyor 160 and collect fired ware from the table 164 and return the empty batts 80 to the loading end. A mere transposition of the loading conveyor 160 so that it runs "north" instead of "south," a transposition of the transferrer 165 through 180° and a shifting of the switch 298 and bumper 333 to 337 to the other side of the feeding conveyor 161 will place the loading station and the receiving table 164 close together and such arrangement was originally adopted and is preferred when only one kiln is used, but when a battery of kilns are used the arrangement herein described is preferred. In any event one man can run the kiln of the present invention including loading the ware, removing, inspecting and packing the ware, and controlling the temperature of the various zones of the kiln.

When the kiln is first started it contains no batts and therefore none are emerging and there is nothing to open the switch 477 in each cycle unless the switch 477 be operated by hand. However it is best that the operation be automatic and therefore the switch 428 is provided. By shifting the two way hand operated switch 597 so that, instead of connecting the line 596 to the line 599, it connects a line 789 to the line 599, the kiln will operate automatically without using the switch 477. For the line 789 is connected to one side of the normally closed switch 428, and the other side of this switch is connected by a branch line 790 to the main line 532. The ram 159 itself hits the roller 431 of the switch 428 and therefore opens it, thus causing the ram to retreat exactly the same as if the circuit had been broken by the switch 477.

It is further desirable that the apparatus be so arranged that the kiln can be quickly loaded with batts. The switch 537 is provided for this purpose and is a two position double pole hand switch. During regular operation of the kiln it is closed to the right and connects the line 536 to the line 538 as previously stated. But if it is closed to the left, it connects the line 538, via a switch line 791 connected to the line 538, to a line 795 that runs to the line 556. This cuts out the timer (the operating function of which is simply to connect lines 538 and 556 after adjustable intervals of time) so the cycle repeats just as fast as the mechanisms can operate.

The hand switch 523 is the main disconnect switch and when it is opened none of the mechanisms can operate except that the ram 159, if forward will retreat and stop and the elevator 162, if up, will go down and stop. The hand switch 526, when opened, cuts the circuits to the loading conveyor 160, the feeding conveyor 161, the elevator solenoid 565, the ram solenoid 610, and the transferrer 165, but the discharging conveyor 163 can still be used if the switch 523 is closed. For shutting down the apparatus for any reason the switch 526 should usually be used, since the discharging conveyor circuits will remain dead anyway unless the switch 460 is touched, and because it is desired to keep the relay 715 alive during a shut down so that the mechanism will restart properly to complete the uncompleted cycle or start a new one. This relay 715, if alive when the hand switch 526 is opened, will remain so, since its holding circuit through relay switch 725 is fed from the main lines 524 and 525 which are unaffected by the switch 526.

The hand switch 782 can be used at any time to cut out the motor 230 which operates the loading conveyor and it doesn't affect anything else. This switch 782 is useful when adjusting batts on the loading conveyor for any reason. In this connection the loading conveyor may be started at any time between the active parts of the cycle, simply by removing the batt 80 that is on the transferrer 165 and touching the roller 352 to open the switch 350. This starts the motor 230 which may then be stopped by touching the roller 296 of the switch 298 or simply allowing the next batt 80 to ride onto the transferrer 165 and hit the roller 296. Likewise the discharging conveyor 163 can be started at any time simply by manual closing of the switch 460 and can be stopped by manual opening of the switch 464.

When starting the kiln after it has been shut down and cooled off, it is best to feed it with batts 80 having dummy ware, meaning refractory pieces which have been fired. The dummy ware soaks up the heat and enables the operator gradually to bring the zones to the desired temperature gradients. If no dummy ware is used, the temperature gradients will change as the green ware is introduced. Dummy ware may consist of rectangular blocks of refractory material of about the same weight as a load of green ware and about the same specific heat. Once the temperature gradients are established the green ware may be fed to the kiln and will be given the proper heating cycle, and after about four hours all of the dummy ware is out.

Important features of the invention reside in the accurate clocked time intervals between the feeding of successive batts 80 into the tunnel 35, the use of relatively narrow batts 80 (those used being three and three quarters inches wide, that is in the dimension lengthwise of the kiln) and the interlocking projections 84 and grooves 85 of the batts 80. Regular timed feeding helps to keep the various zones at the desired temperature gradients. It also gives each piece of ware and each batt 80 the same heat treatment. Wide batts receive greater heat shock than narrow batts because they extend over a longer part of each zone. Refractory batts in general are rather subject to breakage from heat shock, but by using thin narrow ones we can operate this kiln with only an occasional batt breaking. This is where the interlocking of the batts is important, because by doing this with the projections 84 and grooves 85 we find that a batt or even two successive batts can fracture in the kiln without disrupting the operation. The broken batt or batts are held up by the interlocking and the pressure due to the friction between batts 80 and the rods 77 and the thrust imparted by the ram 159. We therefore find that the kiln operates well with each batt mounted for sliding involving a substantial amount of friction.

While so far as certain features of the invention are concerned the discharging conveyor might be dispensed with, nevertheless it measurably increases the efficiency of the kiln because it removes batts from the line or train of batts thus holding the force required to move the line to a certain limit in order to avoid upsetting of the batts in the tunnel 35.

It will thus be seen that there has been provided by this invention a tunnel kiln and automatic feeding apparatus in which the various objects hereinabove set forth together with many thoroughly practical advantages are successfully achieved. As many possible embodiments may be made of the above invention and as many changes might be made in the embodiment above set forth, it is to be understood that all matter hereinbefore set forth or shown in the accompanying drawings is to be interpreted as illustrative and not in a limiting sense.

We claim:

1. Apparatus for automatically moving "green" articles to be vitrified through a tunnel kiln comprising, the combination with a refractory structure forming a long tunnel, and a great number of refractory flat batts supported in said tunnel and free to be moved therethrough, of mechanism to feed the batts intermittently into said tunnel and thrust them in a direction in line with said tunnel with sufficiently great force to propel all of the batts in the tunnel, said mechanism comprising a ram at the entrance end of the tunnel and spaced therefrom by at least the distance of the dimension along the tunnel of a batt from said entrance end, power means to move said ram towards and to retract it away from the tunnel, said movement being substantially in line with the tunnel, an elevator movable up and down from a position below said tunnel to the level of the tunnel and between the entrance end thereof and the ram when the ram is retracted, power means to raise and lower the elevator, a pair of endless conveyor strands one on either side of the elevator, power means to move said conveyor strands in unison, and control mechanism to energize the several power means in sequence intermittently to transfer a batt from the conveyor strands to the elevator and then to a position in front of the ram and to ram the batt into the tunnel thereby causing another batt to emerge from the tunnel.

2. In apparatus as claimed in claim 1, the combination with the parts and features therein specified, of a conveyor additional to the pair of endless conveyor strands, said conveyor being positioned to deliver batts to said endless conveyor strands, additional power means to operate said additional conveyor, and additional control mechanism to energize said additional power means once for every operation of the ram.

3. In apparatus as claimed in claim 2, the combination with the parts and features therein specified, of a timing mechanism controlling said control mechanism and set to interrupt the feeding of batts intermittently into said tunnel for a given interval of time between the successive feeding of batts into said tunnel.

4. In apparatus as claimed in claim 3, the combination with the parts and features therein specified, of a discharging conveyor at the exit end of the tunnel and power means to operate it, whereby to remove the batt from the exit end every time a batt emerges from the tunnel.

5. In apparatus as claimed in claim 1, the combination with the parts and features therein specified, of a timing mechanism controlling said control mechanism and set to interrupt the feeding of batts intermittently into said tunnel for a given interval of time between the successive feeding of batts into said tunnel.

6. In apparatus as claimed in claim 1, the combination with the parts and features therein specified, of a discharging conveyor at the exit end of the tunnel and power means to operate it, whereby to remove the batt from the exit end every time a batt emerges from the tunnel.

GEORGE N. JEPPSON.
EDWARD VAN der PYL.

REFERENCES CITED

The following references are of record in the file of this patent:

UNITED STATES PATENTS

| Number | Name | Date |
| --- | --- | --- |
| 409,489 | Nungesser | Aug. 20, 1889 |
| 670,777 | Guastavino | Mar. 26, 1901 |
| 671,990 | Diescher et al. | Apr. 16, 1901 |
| 1,306,160 | Zwermann | June 10, 1919 |
| 1,485,118 | Larson | Feb. 26, 1924 |
| 1,486,265 | Pike | Mar. 11, 1924 |
| 1,515,511 | Miliver | Nov. 11, 1924 |
| 1,559,199 | Straight | Oct. 27, 1925 |
| 1,649,926 | Ruckstahl et al. | Nov. 22, 1927 |
| 1,700,002 | Trautman | Jan. 22, 1929 |
| 1,718,443 | Straight | June 25, 1929 |
| 1,776,823 | Summey | Sept. 30, 1930 |
| 1,795,819 | Axell | Mar. 10, 1931 |
| 1,815,666 | Cook | July 21, 1931 |
| 1,827,543 | Robertson | Oct. 13, 1931 |
| 1,872,904 | Daae | Aug. 23, 1932 |
| 1,875,365 | Begeman | Sept. 6, 1932 |
| 2,034,721 | Howe | Mar. 24, 1936 |
| 2,215,581 | Fackt | Sept. 24, 1940 |
| 2,254,913 | Roth | Sept. 2, 1941 |
| 2,290,551 | Gier | July 21, 1942 |
| 2,320,172 | Brooke et al. | May 25, 1943 |
| 2,326,953 | Le Tourneau | Aug. 17, 1943 |
| 2,340,354 | Wells | Feb. 1, 1944 |
| 2,347,407 | Goodwin et al. | Apr. 25, 1944 |
| 2,359,157 | Roth | Sept. 26, 1944 |
| 2,404,059 | Hall | July 16, 1946 |
| 2,465,137 | Van Nordstrand | Mar. 22, 1949 |